United States Patent
Cao et al.

(10) Patent No.: US 12,302,465 B2
(45) Date of Patent: May 13, 2025

(54) LED DRIVING CIRCUIT AND LED LAMP

(71) Applicant: CH LIGHTING TECHNOLOGY CO., LTD., Zhejiang (CN)

(72) Inventors: Shengjun Cao, Zhejiang (CN); Tiantian Xu, Zhejiang (CN); Jizhong Pu, Zhejiang (CN)

(73) Assignee: CH LIGHTING TECHNOLOGY CO., LTD., Shaoxing (CN)

( * ) Notice: Subject to any disclaimer, the term of this patent is extended or adjusted under 35 U.S.C. 154(b) by 167 days.

(21) Appl. No.: 18/166,499

(22) Filed: Feb. 9, 2023

(65) Prior Publication Data

US 2024/0008153 A1 Jan. 4, 2024

(30) Foreign Application Priority Data

Jun. 30, 2022 (CN) .......................... 202221698910.8

(51) Int. Cl.
*H05B 45/50* (2022.01)
*H05B 31/50* (2006.01)
*H05B 45/10* (2020.01)
*H05B 45/345* (2020.01)
*H05B 45/375* (2020.01)
*H05B 45/46* (2020.01)

(52) U.S. Cl.
CPC ........... *H05B 45/50* (2020.01); *H05B 45/345* (2020.01); *H05B 45/375* (2020.01)

(58) Field of Classification Search
CPC ...... H05B 45/46; H05B 45/10; H05B 45/395; H05B 45/375; H05B 45/48; H05B 45/50; H05B 45/3725; H05B 45/38; H05B 45/345; H05B 45/34; H05B 45/382; H05B 45/00
See application file for complete search history.

(56) References Cited

U.S. PATENT DOCUMENTS

| | | | |
|---|---|---|---|
| 10,716,184 B1 | 7/2020 | Pu et al. | |
| 2012/0019714 A1* | 1/2012 | Hiramatu | H05B 47/16 348/370 |
| 2012/0038292 A1* | 2/2012 | Kuo | H05B 45/20 315/297 |
| 2012/0112650 A1* | 5/2012 | Kuo | H05B 45/3725 315/200 R |
| 2013/0009547 A1* | 1/2013 | Shiu | H05B 45/50 315/125 |
| 2013/0147379 A1* | 6/2013 | Zhou | H05B 45/00 315/210 |

(Continued)

*Primary Examiner* — Wei (Victor) Y Chan

(57) ABSTRACT

An LED driving circuit includes a rectifying unit, a filtering unit, a power conversion unit and a leakage protection unit. The leakage protection unit includes: a main control chip capable of detecting an impedance of a power grid and turning on or off an LED driving circuit loop depending on whether the impedance of the power grid exceeds a set value; and a first switching element arranged outside the main control chip and controlled thereby to turn on or off the LED driving circuit loop synchronously with the main control chip. The present disclosure includes the first switching element capable of turning on or turning off the LED driving circuit loop, and the first switching element is arranged independently of the main control chip, achieving shunting of the current flowing through the leakage protection unit, reducing an operating temperature of the main control chip for compatibility with high power products.

17 Claims, 8 Drawing Sheets

(56) References Cited

U.S. PATENT DOCUMENTS

2013/0155561 A1\* 6/2013 Lai .................. H05B 45/54
                                                            315/246
2018/0153014 A1\* 5/2018 Yang ................ H05B 47/10

\* cited by examiner

LED DRIVING CIRCUIT AND LED LAMP

CROSS-REFERENCE TO RELATED APPLICATIONS

The present disclosure claims priority of Chinese Utility Model Application No. 202221698910.8, filed on Jun. 30, 2022, the entire contents of which are hereby incorporated by reference.

TECHNICAL FIELD

The disclosure relates to the technical field of lighting technology, and more particularly to an LED driving circuit and an LED lamp.

DESCRIPTION OF THE PRIOR ART

LED driving circuits are widely applicable to LED lamps, a leakage protection unit is typically arranged within the LED driving circuit to address safety issue of electric shock. Taking an LED tube as an example, one end of the LED tube is usually installed first, and then the other end is installed, the leakage protection unit is able to open the circuit in time when the operation is mishandled. For example, U.S. Ser. No. 10/716,184B1 discloses a leakage protection unit which can fulfill the above functions.

In practical use, the leakage protection circuit is implemented by a main control chip and its peripheral circuits, the main control chip detects a voltage and a current of a power grid. However, limited by the specifications of the main control chip, and the power of the leakage protection unit implemented by the main control chip is also limited and not adequate for high power leakage protection.

SUMMARY OF THE DISCLOSURE

Based on this, there is a need to provide an LED driving circuit to solve or at least mitigate the above-described technical problem.

The LED driving circuit includes a rectifying unit, a filtering unit, a power conversion unit and a leakage protection unit; the leakage protection unit includes:

a main control chip, configured to detect an impedance of a power grid and turn on or turn off an LED driving circuit loop depending on whether the impedance of the power grid exceeds a set value; and a first switching element, arranged outside the main control chip and controlled by the main control chip to turn on the LED driving circuit loop synchronously with an action of the main control chip of turning on the LED driving circuit loop, wherein the first switching element is further controlled by the main control chip to turn off the LED driving circuit loop synchronously with an action of the main control chip of turning off the LED driving circuit loop.

Alternatively, the main control chip includes a control terminal outputting a corresponding control signal to the first switching element; the first switching element is a MOS transistor including a first input terminal, a second output terminal connected to ground, and a first driving terminal coupled to the control terminal.

Alternatively, the first input terminal is coupled to a negative polarity of an LED load or a cathode of the filtering unit.

Alternatively, a second switching element is integrated in the main control chip and configured to turn on or turn off the LED driving circuit loop, the second switching element and the first switching element are arranged in parallel.

Alternatively, the second switching element is a MOS transistor.

Alternatively, an internal resistance of the second switching element is greater than an internal resistance of the first switching element.

Alternatively, the main control chip includes a power supply terminal coupled to the rectifying unit via a voltage-decreasing and current-limiting sub-circuit.

Alternatively, the main control chip includes a current sampling terminal coupled to a current sampling sub-circuit.

Alternatively, the main control chip includes a voltage sampling terminal coupled to a voltage sampling sub-circuit.

The disclosure also provides an LED lamp including a lamp housing, a conductive element fixed on the lamp housing, and a lighting assembly arranged inside the lamp housing, the lighting assembly and the conductive element are electrically connected together via the LED driving circuit.

The disclosure also provides another LED driving circuit including:

a rectifying unit, configured to convert an alternating current to a direct current;

a filtering unit, configured to filter the direct current;

a power conversion unit, configured to provide a steady current to a load;

an impedance detection subunit, configured to detect an impedance of a power grid;

a driving subunit, comparing the impedance with a set value, to output a corresponding driving signal;

a first switching element, receiving the driving signal, and turning on or turning off a LED driving circuit loop; and a second switching element, arranged in parallel with the first switching element, synchronously receiving the driving signal, and turning on or turning off the LED driving circuit loop.

Alternatively, the impedance detection subunit and the driving subunit are integrated into a main control chip.

Alternatively, the impedance detection subunit includes a voltage memory, a current memory, and an impedance detector.

Alternatively, the driving subunit includes an impedance comparator, a state machine coupled to the first switching element, and a gate driver coupled to the second switching element; the impedance comparator, the state machine and the gate driver are coupled in sequence.

Alternatively, the second switching element is integrated in the main control chip.

Alternatively, both of the first switching element and the second switching element are MOS transistors.

The present LED driving circuit has at least the following technical effects that:

The present LED driving circuit includes the first switching element capable of turning on or turning off an LED driving circuit loop, and the first switching element is arranged independently of the main control chip, which achieves shunting of the current flowing through the leakage protection unit, thereby reducing an operating temperature of the main control chip for compatibility with high power products.

DESCRIPTION OF EMBODIMENTS

The technical solutions in embodiments of the present disclosure will be clearly and fully described below with reference to the accompanying drawings in embodiments of the present disclosure, and it will be apparent that the embodiments described are only some, but not all, embodiments of the present disclosure. Based on the embodiments in the present disclosure, all other embodiments obtained by one of ordinary skill in the art without creative labor are intended to be within the protection scope of the present disclosure.

It should be noted that when a component is referred to as being "coupled" with another component, it can be directly connected with the other component or intervening components may also be present. When one component is referred to as being "arranged on" another component, it can be directly arranged on the other component or intervening components may be present at the same time.

Unless defined otherwise, all technical and scientific terms used herein have the same meaning as commonly understood by one of ordinary skill in the art to which this disclosure belongs. The terms used in the description of the disclosure herein is for the purpose of describing particular embodiments only and is not intended to limit the application. As used herein, the term "and/or" includes any and all combinations of one or more of the associated listed items.

Figure 1:
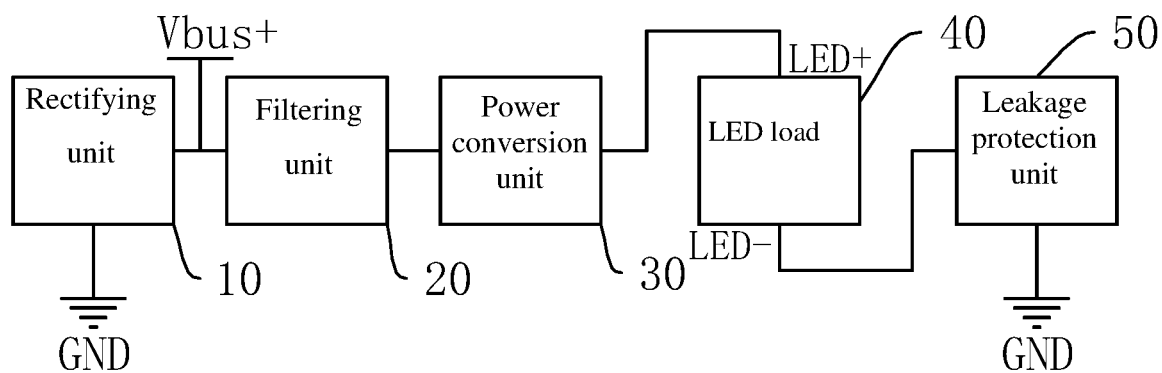
FIG. 1 is a schematic block diagram of an LED driving circuit according to an embodiment of the present disclosure.

Referring to FIG. 1, an embodiment of the present disclosure provides an LED driving circuit to supply power to an LED load 40, the LED driving circuit includes a rectifying unit 10, a filtering unit 20, and a power conversion unit 30. The rectifying unit 10, the filtering unit 20, and the power conversion unit 30 are coupled in sequence.

The rectifying unit 10 may be, for example, a full wave rectifying bridge including a high potential output terminal Vbus+ and a ground low potential output terminal. The filtering unit 20 may be, for example, implemented by a π-type filter and the power conversion unit 30 may be implemented based on a BUCK principle, both of the filtering unit 20 and the power conversion unit 30 may adopt existing structures which are not described in detail herein. The LED load includes a positive terminal LED+ and a negative terminal LED−.

As shown in FIG. 1, in this embodiment the LED driving circuit also includes a leakage protection unit 50, in some embodiments, the negative terminal LED− of the LED load 40 is grounded via the leakage protection unit 50, such that a loop is formed in the LED driving circuit.

Figure 2:
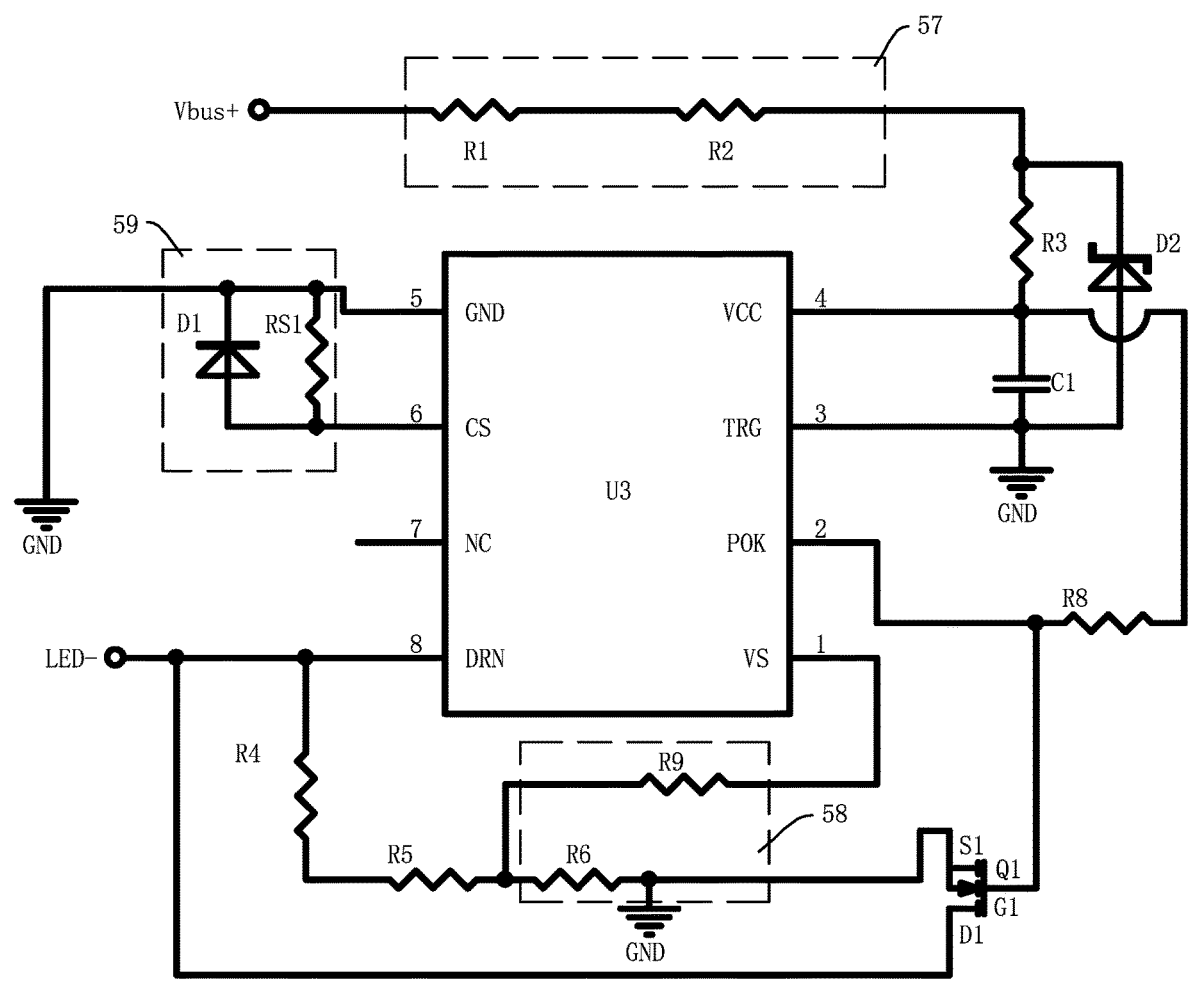
FIG. 2 is a schematic circuit diagram of a leakage protection unit according to an embodiment of the present disclosure.

As shown in FIG. 2, the leakage protection unit 50 includes a main control chip U3 and a peripheral circuitry of the main control chip U3. The main control chip U3 may detect whether an impedance of a power grid is greater than a set value, if the impedance is greater than the set value, an LED driving circuit loop is turned off, and if the impedance is less than the set value, the LED driving circuit loop is turned on. In some embodiments, the main control chip U3 may be a commercially available product such as the product having a model number of LT2600.

Figure 3:
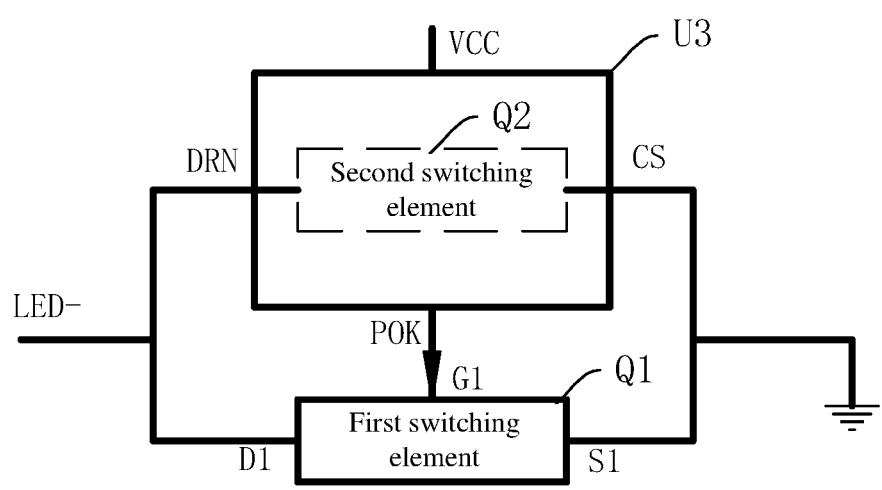
FIG. 3 is a schematic block diagram of a leakage protection unit according to an embodiment of the present disclosure.
Figure 4:
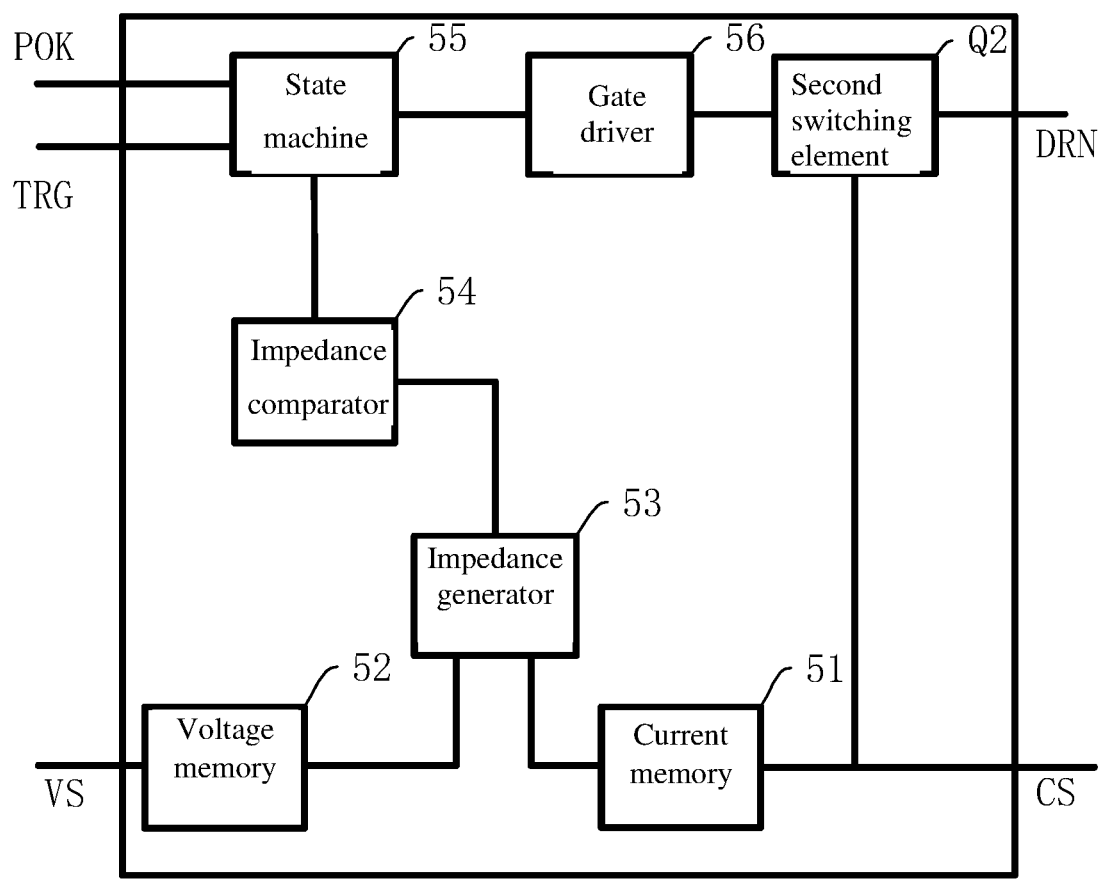
FIG. 4 is a schematic block diagram of a main control chip according to an embodiment of the present disclosure.

To achieve the above functions, as shown in FIGS. 3 and 4, a second switching element Q2 is integrated in the main control chip U3 and is capable of turning on or turning off the LED driving circuit loop.

As shown in FIG. 4, in some embodiments, a voltage memory 51, a current memory 52, an impedance generator 53, an impedance comparator 54, a state machine 55, and a gate driver 56 are integrated in the main control chip U3. The voltage memory 51 is coupled to a voltage sampling terminal of the main control chip U3 and may store an acquired voltage, and the current memory 52 is coupled to a current sampling terminal of the main control chip U3 and may store an acquired current. The acquired voltage and the acquired current are inputted to the impedance generator 53 and are calculated to obtain a current impedance of the power grid. The impedance comparator 54 compares a value of the impedance with a set value, if the value of the impedance is greater than the set value (e.g., 300 ohms), the second switching element Q2 is turned off by the gate driver 56, so that the LED driving circuit loop does not conduct, and the current does not flow through the LED load. If the value of the impedance is less than the set value, the second switching element Q2 is turned on by the gate driver 56, so that the LED driving circuit loop is turned on, the LED lamp can work normally and an electric shock risk caused by human contacting with the lamp may be avoided.

In some embodiments, the second switching element Q2 is a MOS transistor and the second switching element Q2 is integrated in the main control chip U3 and allows less current to pass through. When the driving circuit is applied to a high-power LED lamp, the second switching element Q2 heats up severely, which results in degraded or even damaged performance of the main control chip U3.

In order to solve the above problem, referring to FIGS. 2-3, the leakage protection unit 50 further includes a first switching element Q1 controlled by the main control chip U3 to turn on or turn off the LED driving circuit loop synchronously with the main control chip U3, in particular, the first switching element is controlled by the main control chip to turn on the LED driving circuit loop synchronously with an action of the main control chip of turning on the LED driving circuit loop, and the first switching element is controlled by the main control chip to turn off the LED driving circuit loop synchronously with an action of the main control chip of turning off the LED driving circuit loop. The first switching element Q1 is arranged independently outside the main control chip U3.

As shown in FIGS. 2 and 3, a pin DRN of the main control chip U3 is coupled to a second input terminal of the second switching element Q2 and a pin CS is coupled to a second output terminal of the second switching element Q2. The first switching element Q1 includes a first input terminal D1 coupled to the pin DRN and a first ground output terminal S1. The first switching element Q1 and the second switching tube Q2 form a parallel arrangement.

The main control chip U3 includes a pin POK, i.e., a control terminal thereof, the control terminal may output a corresponding control signal so that the first switching element Q1 is turned on or off depending on whether the detected impedance exceeds the set value. In some embodiments, the first switching element Q1 is a MOS transistor including a first driving terminal G1 coupled to the control terminal.

When the main control chip U3 detects that the impedance of the power grid is less than the set value (e.g., 300 ohms), the pin POK (i.e., the control terminal) outputs a high level, the first driving terminal G1 acquires the high level and the first switching element Q1 is turned on. When the main control chip U3 detects that the impedance of the power grid is greater than the set value (human contacts the lamp), the pin POK (i.e., the control terminal) outputs a low level and the first switching element Q1 is turned off.

It can be seen that the first switching element Q1 and the second switching element Q2 are turned on or off synchronously, mainly depending on whether a human body is touching the lamp and gets electric shock or not. The present disclosure achieves shunting of current flowing through the leakage protection unit by means of the first switching element Q1, thereby reducing an operating temperature of the main control chip (mainly caused by the second switching element Q2) for compatibility with high power products, without affecting original functions of the main control chip.

In some embodiments, an internal resistance of the second switching element Q2 is greater than an internal resistance of the first switching element Q1, such that the first switching element Q1 assumes most of the current.

Referring to FIG. 2, the main control chip U3 includes a pin VCC which is a power supply terminal of the main control chip U3, the power supply terminal is coupled to a high potential output terminal Vbus+ of the rectifying unit 10. In some embodiments, the power supply terminal is coupled to the high potential output terminal Vbus+ via a voltage-decreasing and current-limiting sub-circuit 57. In some embodiments, the voltage-decreasing and current-limiting sub-circuit 57 is formed by a resistor R1 and a resistor R2 which are connected in series. The pin VCC is also connected to ground through a capacitor C1. A resistor R3 and the capacitor C1 are connected in series to form a branch which is connected to a voltage stabilizing diode D2 in parallel, to stabilize a supply voltage of the main control chip. The voltage stabilizing diode D2 is mainly designed to absorb a surge current, thereby protecting the main control chip U3. The resistor R3 and the voltage stabilizing diode D2 are used to discharge the capacitor C1 when AC powers on.

Referring to FIG. 2, in some embodiments, the first driving terminal G1 is coupled to the pin VCC via a resistor R8.

Referring to FIG. 2, the main control chip U3 includes a pin VS served as a voltage sampling terminal and a pin CS served as a current sampling terminal. The voltage sampling terminal is coupled to a voltage sampling sub-circuit 58, and the current sampling terminal is coupled to a current sampling sub-circuit 59. As shown in FIG. 2, and in some embodiments, the voltage sampling sub-circuit 58 includes a resistor R9 and a resistor R6 which are connected in series and connected to ground. Resistors R4, R5 and R6 are connected in series, one end of the resistor R4 is coupled to the negative terminal LED− of the LED load, and one end of the resistor R6 is connected to ground, to provide a voltage signal to the voltage sampling terminal VS. In some embodiments, the current sampling sub-circuit 59 includes a diode D1 and a resistor RS1 which are connected in parallel and connected to ground.

Referring to FIG. 2, the main control chip U3 includes a pin TRG which is designed to be adapted to an emergency power supply, and when the DC current is inputted and when the capacitor C1 of the pin TRG has a voltage of 3V, the main control chip U3 is forced to work properly.

The overall working principle of the LED driving circuit of the disclosure is as follows.

With reference to FIGS. 1 to 4, the LED driving circuit is powered up and then the rectifying unit carries out rectification and outputs Vbus+ which in turn supplies power to the power supply terminal VCC and the capacitor C1 through the resistors R1 and R2, and the main control chip U3 is activated.

The current flows from the negative terminal LED− of the LED and passes through the resistors R4, R5 and R6 for voltage division, and the pin VS continues sampling a voltage through the voltage sampling sub-circuit 58 until a falling edge voltage of the second switching element Q2 is sampled (e.g., the falling edge voltage of 20V is sampled), and the voltage memory 52 stores a value of the voltage, at this time the second switching element is turned on.

The pin CS samples a current value through the current sampling sub-circuit 59 and is stored by the current memory 51. The current memory 51 and the voltage memory 52 transmit the current and the voltage to the impedance generator 53 which calculates the impedance of the power grid.

Depending on whether the impedance of the power grid is greater than a set value (e.g., 300 ohms), the main control chip U3 controls the first switching element Q1 and the second switching element Q2 simultaneously to be turned on or off either through an internal logic structure or an external port, such that the LED driving circuit loop may be opened in time when a human body touches the lamp, thereby protecting operator's safety.

Figure 5:
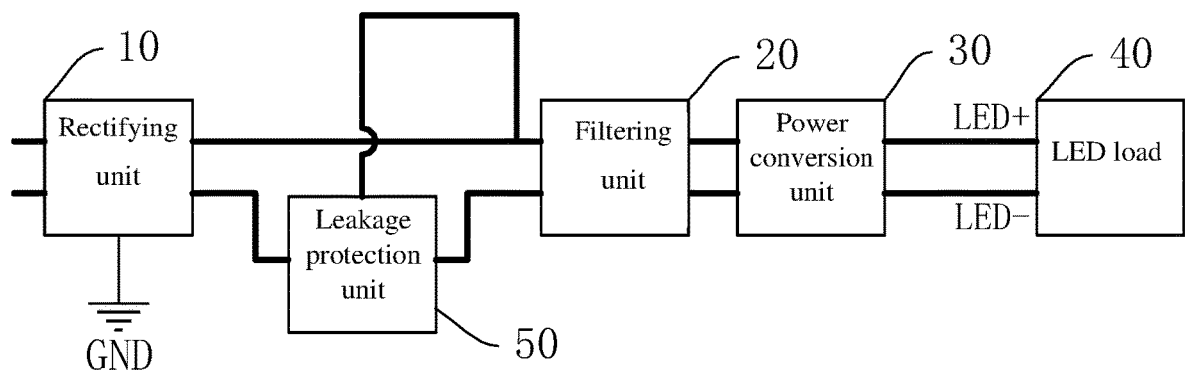
FIG. 5 is a schematic block diagram of an LED driving circuit according to another embodiment of the present disclosure.

As shown in FIG. 5, the present disclosure provides another embodiment of an LED driving circuit configured to supply power to an LED load 40. The LED driving circuit includes a rectifying unit 10, a filtering unit 20, and a power conversion unit 30 which are coupled in sequence. The rectifying unit is configured to convert an alternating current to a direct current. The filtering unit is configured to filter the direct current. The power conversion unit is configured to provide a steady current to a load. Each of the rectifying unit, the filtering unit, and the power conversion unit may adopt the conventional structure previously described.

In this embodiment, the LED driving circuit further includes a leakage protection unit 50 coupled between the rectifying unit 10 and the filtering unit to turn on or turn off the entire LED driving circuit loop. The leakage protection unit may have a configuration and a working manner the same as those of the leakage protection unit described in any of the embodiments herein.

Figure 6:
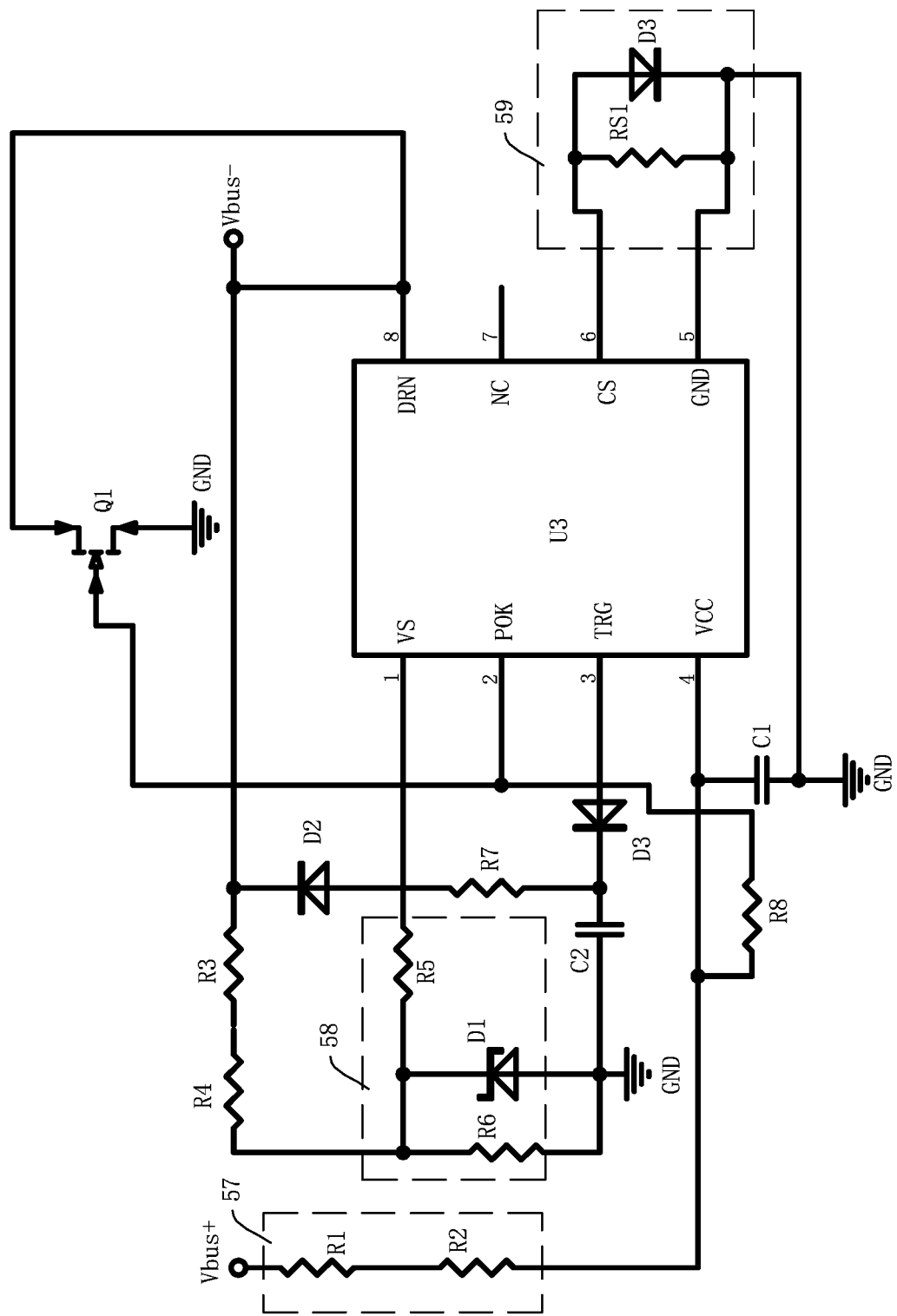
FIG. 6 is a schematic circuit diagram of a leakage protection unit according to another embodiment of the present disclosure.

As shown in FIG. 6, the present disclosure also provides a leakage protection unit 50 including a main control chip U3 and a peripheral circuitry of the main control chip U3. The basic structure and working manner of the main control chip U3 is identical to that of the main control chip in the above-described embodiments and will not be repeated here.

As shown in FIG. 6, in order for compatibility with high-power LED lamps, similarly, the leakage protection module 50 includes a first switching element Q1. An input terminal of the first switching element Q1 is coupled to the pin DRN of the main control chip U3 and an output terminal of the first switching element Q1 is coupled to ground. The main control chip U3 includes a pin POK, i.e., a control terminal thereof, the control terminal outputs a corresponding control signal so that the first switching element Q1 is turned on or off depending on whether the detected impedance exceeds a set value.

When the main control chip U3 detects that the impedance of the power grid is less than the set value (e.g., 300 ohms), the pin POK (i.e., the control terminal) outputs a high level, the first driving terminal G1 acquires the high level and the first switching element Q1 is turned on. In case the main control chip U3 detects that the impedance of the power grid is greater than the set value (human contacts the lamp), the pin POK (i.e., the control terminal) outputs a low level and the first switching element Q1 is cut off.

Referring to FIG. 6, the main control chip U3 includes a pin VCC which is a power supply terminal of the main control chip U3, and the power supply terminal is coupled to a high potential output terminal Vbus+ of the rectifying unit 10. In some embodiments, the power supply terminal is coupled to the high potential output terminal Vbus+ through a voltage-decreasing and current-limiting sub-circuit 57. In some embodiments, the voltage-decreasing and current-limiting sub-circuit 57 is formed by a resistor R1 and a resistor R2 which are connected in series. The pin VCC is also connected to ground through a capacitor C1 to stabilize a supply voltage of the main control chip.

As shown in FIG. 6, in some embodiments, the driving terminal of the first switching element Q1 is coupled to the pin VCC via a resistor R8.

As shown in FIG. 6, the main control chip U3 includes a pin VS which is a voltage sampling terminal of the main control chip U3 and a pin CS which is a current sampling terminal of the main control chip U3. The voltage sampling terminal is coupled to the voltage sampling sub-circuit 58, and the current sampling terminal is coupled to the current sampling sub-circuit 59. As shown in FIG. 6, in some embodiments, the voltage sampling sub-circuit 58 includes a resistor R5 and a resistor R6 which are connected in series and connected to ground. A resistor R3, a resistor R4 and a resistor R6 are connected in series to provide a voltage signal to the voltage sampling terminal VS. A voltage stabilizing diode D1 is connected in parallel with the resistor R6, to stabilize a voltage of a junction between the resistor R6 and the resistor R5. In some embodiments, the current sampling sub-circuit 59 includes a diode D4 and a resistor RS1 which are connected in parallel and connected to ground.

As shown in FIG. 6, the main control chip U3 includes a pin TRG which is designed to be adapted to an emergency power supply. The pin TRG is coupled to a diode D3, a resistor R3 and a diode D2, and the main control chip U3 may also work normally when the LED driving circuit is inputted a direct current.

Figure 7:
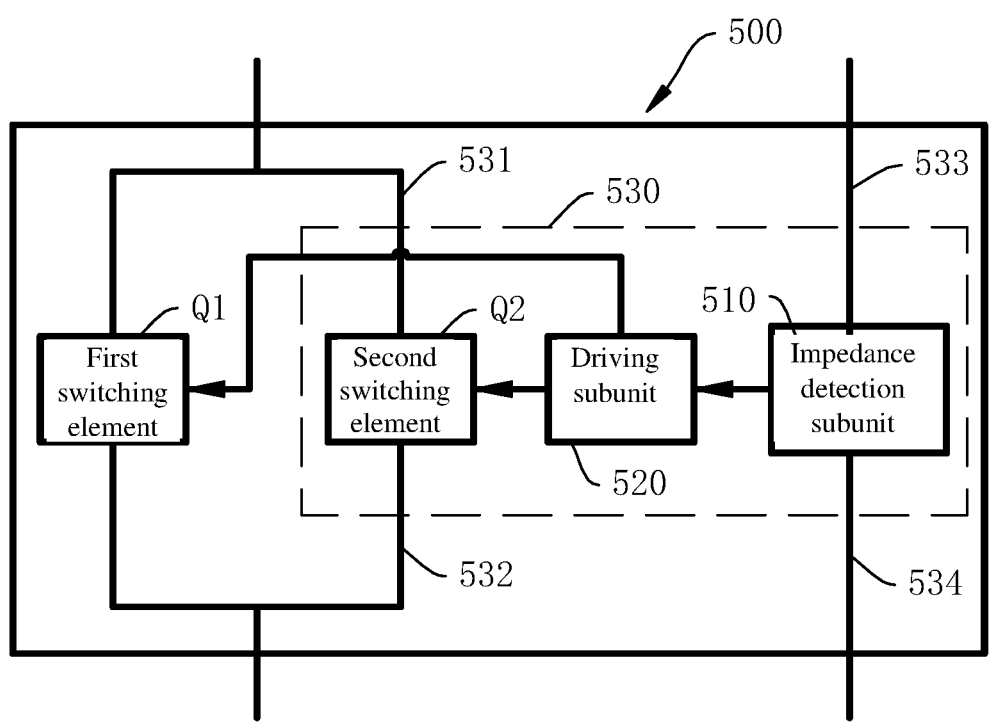
FIG. 7 is a schematic block diagram of a leakage protection unit according to another embodiment of the present disclosure.

As shown in FIG. 7, an embodiment of the present disclosure provides another leakage protection unit 500 including an impedance detection subunit 510, a driving subunit 520, a first switching element Q1 and a second switching element Q2. The first switching element Q1 and the second switching element Q2 are arranged in parallel to turn on or turn off an LED driving circuit loop. The impedance detection subunit 510 is configured to detect an impedance of the power grid. The driving subunit 520 compares the detected impedance with a set value and outputs a corresponding driving signal to the first switching element Q1 and the second switching element Q2 so that the first switching element Q1 and the second switching element Q2 are turned on or off synchronously.

The first switching element Q1 and the second switching element Q2 are turned off if the current impedance of the power grid is detected to be greater than the set value, such as 300 ohms, and turned on if the current impedance of the power grid is detected to be less than the set value.

Figure 8:
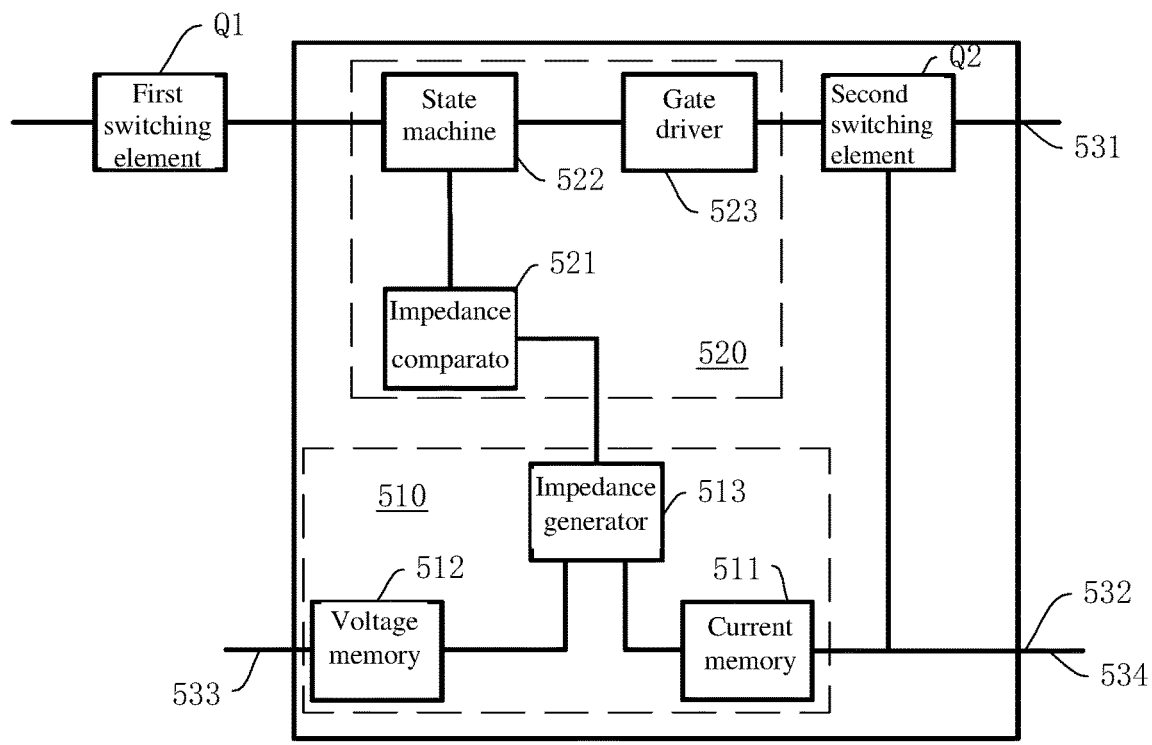
FIG. 8 is a schematic block diagram of a main control chip according to another embodiment of the present disclosure.

As shown in FIGS. 7 and 8, in some embodiments, the impedance detection subunit 510, the driving subunit 520, and the second switching element Q2 are integrated into a main control chip 530. The main control chip 530 includes an input terminal 531, an output terminal 532, a voltage sampling terminal 533, and a current sampling terminal 534. The first switching element Q1 is coupled between the input terminal 531 and the output terminal 532. The impedance detection subunit is coupled to the voltage sampling terminal 533 and the current sampling terminal 534.

In some embodiments, as shown in FIG. 8, the impedance detection subunit 510 may be formed by a current memory 511, a voltage memory 512, and an impedance generator 513. The driving subunit includes an impedance comparator 521, a state machine 522 coupled to a first switching element Q1, and a gate driver 523 coupled to a second switching element Q2, and the impedance comparator 521, the state machine 522 and the gate driver 523 are coupled in sequence.

Figure 9:
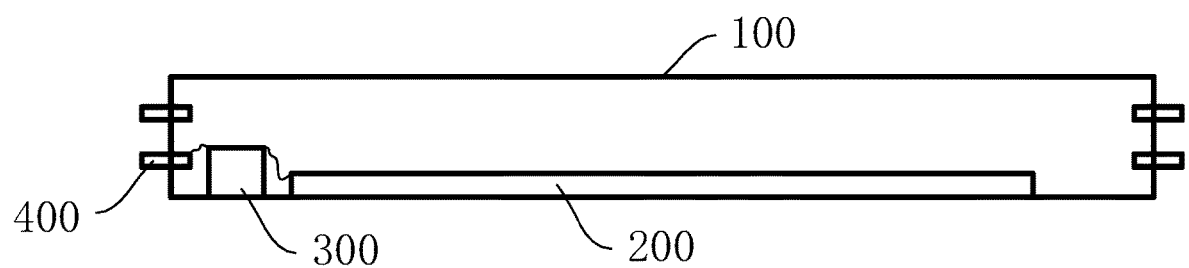
FIG. 9 is a schematic illustration of an LED lamp according to an embodiment of the present disclosure.

As shown in FIG. 9, an embodiment of the present disclosure provides an LED lamp including a lamp housing 100, a conductive element 400 arranged on both ends of the lamp housing, and a driving circuit 300 and a lighting assembly. The driving circuit 300 and the lighting assembly are arranged inside the lamp housing 100. The driving circuit 300 employs a circuit configuration described in the above embodiments, an input terminal of the driving circuit 300 is coupled to the conductive element 400 and an output terminal of the driving circuit 300 is coupled to the lighting assembly 200.

The LED lamp is typically an LED straight tube lamp. The lamp housing includes a tube body and an end cap arranged at each end of the tube body. The tube body is transparent and the conductive element is arranged on the end cap. There is a risk of electrocution during installation, a leakage protection unit needs to be provided in the driving circuit 300. The lighting assembly is a light bar including a substrate and LED lamp beads disposed on the substrate. The light bar is attached to an inner wall of the lamp housing by adhesive bonding.

Any combination of features of the above-described embodiments is possible, and not all possible combinations of features of the above-described embodiments have been described in order to concise the description, however, to the extent that there is no conflict in the combination of features should be considered to be within the scope of the present description. When technical features of different embodiments are embodied in the same drawing, the drawing is to be considered as also disclosing combined embodiments of the various embodiments involved.

The embodiments set forth above represent only a few embodiments of the present disclosure, and the description is specific and detailed, but is not to be construed as limiting the scope of the claims. It should be noted that it will be apparent to those skilled in the art that numerous variations and modifications can be made without departing from the concept of the present disclosure, all of which fall within the scope of the present disclosure.

The invention claimed is:

1. An LED driving circuit, comprising a rectifying unit, a filtering unit, a power conversion unit and a leakage protection unit, wherein the leakage protection unit comprises:
   a main control chip, configured to detect an impedance of a power grid and turn on or turn off an LED driving circuit loop depending on whether the impedance of the power grid exceeds a set value; and
   a first switching element, arranged outside the main control chip and controlled by the main control chip to turn on the LED driving circuit loop synchronously with an action of the main control chip of turning on the LED driving circuit loop, wherein the first switching element is further controlled by the main control chip to turn off the LED driving circuit loop synchronously with an action of the main control chip of turning off the LED driving circuit loop.

2. The LED driving circuit according to claim 1, wherein the main control chip comprises a control terminal outputting a corresponding control signal to the first switching element; the first switching element is a MOS transistor comprising a first input terminal, a second output terminal connected to ground, and a first driving terminal coupled to the control terminal.

3. The LED driving circuit according to claim 2, wherein the first input terminal is coupled to a negative polarity of an LED load.

4. The LED driving circuit according to claim 1, wherein a second switching element is integrated in the main control chip and configured to turn on or turn off the LED driving circuit loop, the second switching element and the first switching element are arranged in parallel.

5. The LED driving circuit according to claim 4, wherein the second switching element is a MOS transistor.

6. The LED driving circuit according to claim 4, wherein an internal resistance of the second switching element is greater than an internal resistance of the first switching element.

7. The LED driving circuit according to claim 1, wherein the main control chip comprises a power supply terminal coupled to the rectifying unit via a voltage-decreasing and current-limiting sub-circuit.

8. The LED driving circuit according to claim 1, the main control chip comprises a current sampling terminal coupled to a current sampling sub-circuit.

9. The LED driving circuit according to claim 1, wherein the main control chip comprises a voltage sampling terminal coupled to a voltage sampling sub-circuit.

10. An LED lamp comprising a lamp housing, a conductive element fixed on the lamp housing, and a lighting assembly arranged inside the lamp housing, wherein the lighting assembly and the conductive element are electrically connected together via the LED driving circuit according to claim 1.

11. An LED driving circuit comprising:
   a rectifying unit, configured to convert an alternating current to a direct current;
   a filtering unit, configured to filter the direct current;
   a power conversion unit, configured to provide a steady current to a load;
   an impedance detection subunit, configured to detect an impedance of a power grid;
   a driving subunit, comparing the impedance with a set value, to output a corresponding driving signal;
   a first switching element, receiving the driving signal, and turning on or turn off a LED driving circuit loop; and
   a second switching element, arranged in parallel with the first switching element, synchronously receiving the driving signal, and turning on or turning off the LED driving circuit loop.

12. The LED driving circuit according to claim 11, wherein the impedance detection subunit and the driving subunit are integrated into a main control chip.

13. The LED driving circuit according to claim 12, wherein the impedance detection subunit comprises a voltage memory, a current memory, and an impedance detector.

14. The LED driving circuit according to claim 12, wherein the driving subunit comprises an impedance comparator, a state machine coupled to the first switching element, and a gate driver coupled to the second switching element; the impedance comparator, the state machine and the gate driver are coupled in sequence.

15. The LED driving circuit according to claim 12, wherein the second switching element is integrated in the main control chip.

16. The LED driving circuit according to claim 11, wherein both of the first switching element and the second switching element are MOS transistors.

17. The LED driving circuit according to claim 2, wherein the first input terminal is coupled to a cathode of the filtering unit.

* * * * *